March 4, 1941.  W. K. WALKER  2,234,030
ELECTRICAL CONTROL SYSTEM
Filed Aug. 20, 1938  3 Sheets-Sheet 1
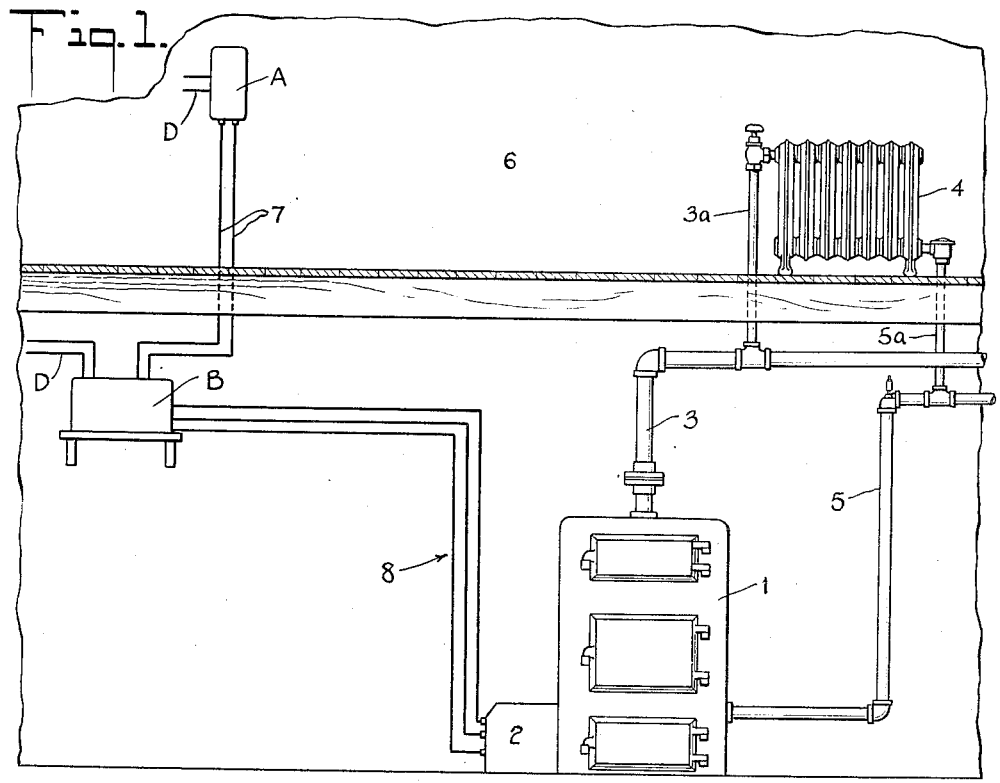
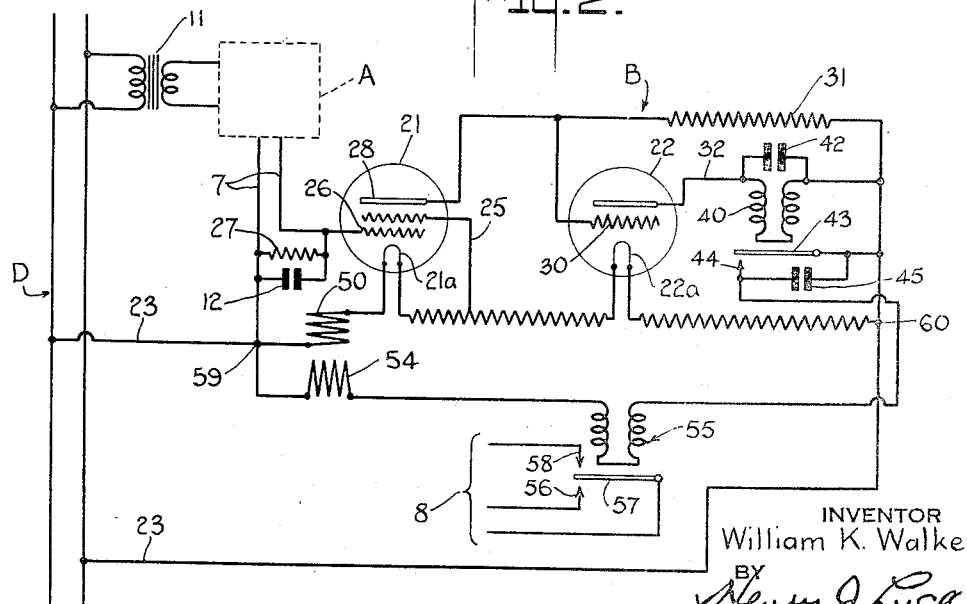
INVENTOR
William K. Walker
BY
Henry J. Lucke
HIS ATTORNEY

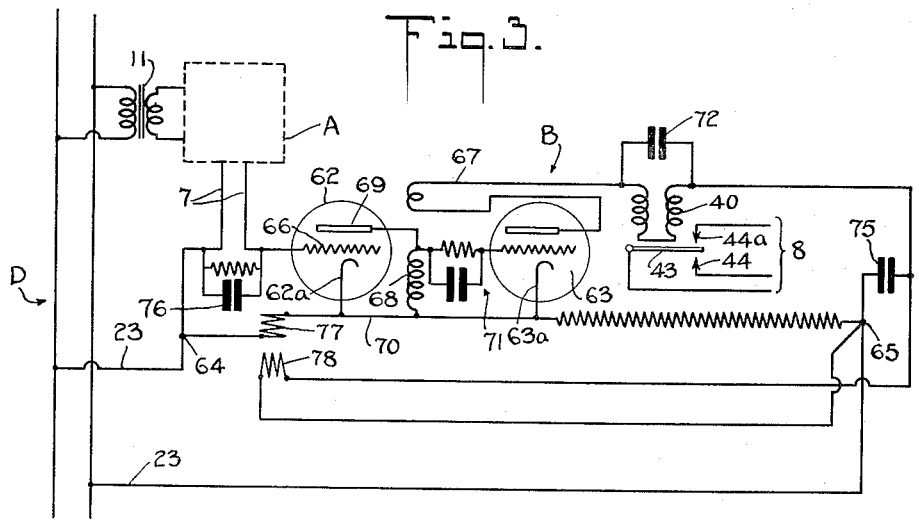
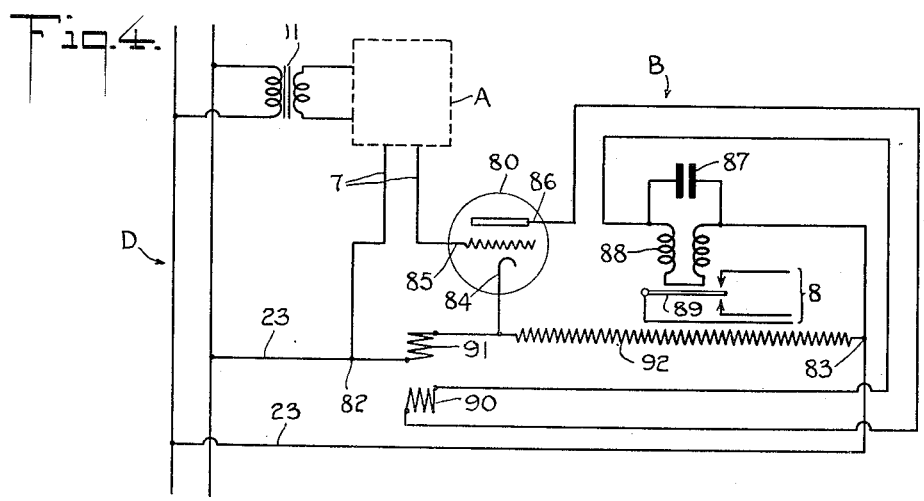
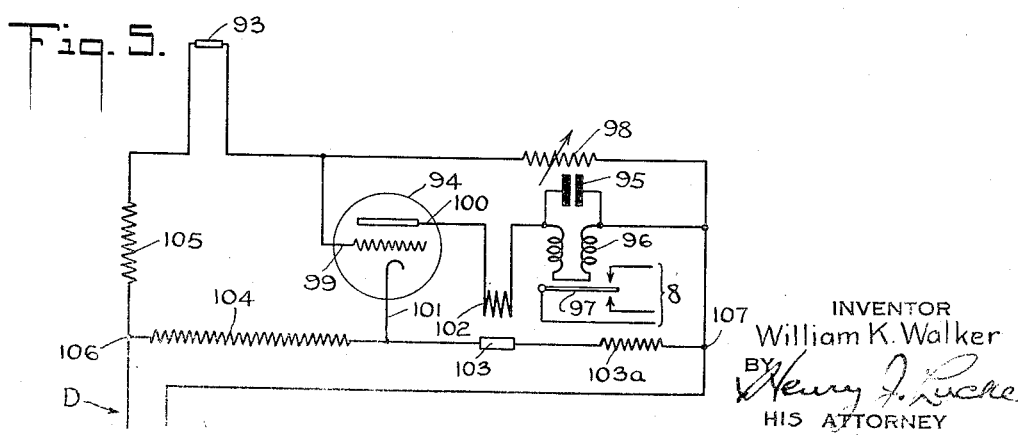

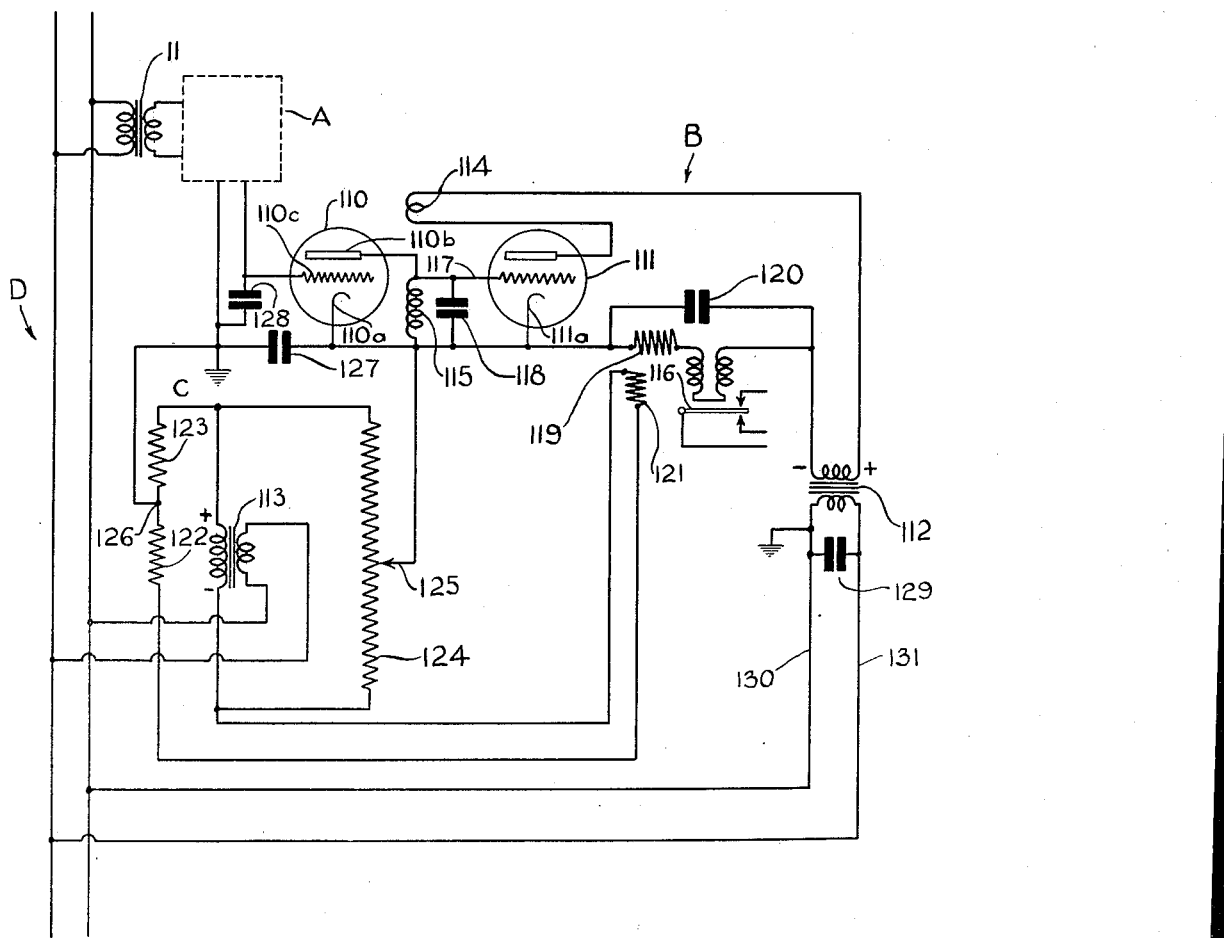

Patented Mar. 4, 1941

2,234,030

UNITED STATES PATENT OFFICE 2,234,030

ELECTRICAL CONTROL SYSTEM

William K. Walker, New York, N. Y., assignor, by mesne assignments, to American Radiator & Standard Sanitary Corporation, New York, N. Y., a corporation of Delaware Application August 20, 1938, Serial No. 225,889

7 Claims. (Cl. 236—68)

This invention relates to control systems of electrical type for exercising control over operating means in response to variant electrical values produced in the system. In preferred forms the variant electrical values are produced by variant resistance values of resistance components which have the property of variation of resistance with variation of temperature.

Thus, embodiments of the invention may be adapted to exercise control over operating means in direct response to temperature conditions at locations remotely or otherwise related to such operating means.

More particularly the invention relates to control systems of the above type which embody additional means affected by variant electrical values in the system and, in turn, modifying electrical values in the system for exercising control of the operating means in anticipation of the exercise of control by the control system proper.

The invention is especially applicable to the thermostatic control of the operation of heat-exchange systems according to the temperature requirements of spaces served by such heat-exchange systems.

Taking a residence or other domestic heating system as a typical example of a controllable heat-exchange system to which the present invention is applicable, it is well known in the heating art that a condition may exist wherein a long delay intervenes before the supply of heat to a heat exchanger so changes the temperature of the control device or thermostat as to shut off the supply of heat, the extent of the delay being determined by local conditions such as location of the thermostat with respect to the heat exchanger, heat capacity of a casing or other housing of such control unit, circulation of air around the temperature sensitive elements of the control unit, etc. Because of this time lag between the heating of the radiator or other heat exchanger and the communication of such heat energy to the thermostat, the latter, during this time period, may drop to a temperature considerably below its control point, and when the heat emitted from the heat exchanger finally is communicated to the thermostat, the heat must raise the temperature of the thermostat to a degree slightly above the temperature at which the thermostat is set to turn on the heat supply, the exact temperature being dependent upon the sensitivity of the thermostat control elements. During the time interval necessary for the thermostat to achieve its temperature setting point and operate the control equipment to shut off the heat, the radiators or other heat exchange units of the heating system may have attained an undesirably high temperature, leading to an overheating of the enclosure. Similarly, but conversely, the time lag between the time the enclosure cools to a point where the thermostat "calls" for additional heat and the time when such heat is available at the heat exchange units, may give the effect of an undesirable cooling to the room or enclosure. A conventional temperature-control system, therefore, has what might be termed a "heat inertia," detrimental to accurate temperature control.

It has been proposed in temperature control systems employing thermostats of the electro-mechanical type, as for example, thermostats embodying a vapor-pressure bellows or bi-metallic element which moves in response to temperature change and which serves to directly actuate a circuit make-and-break device, to employ a small electrically energized heating coil in close proximity to the temperature-sensitive element of the thermostat, and so incorporated in the electrical system that when for example, the thermostat is calling for heat, the heating coil is simultaneously energized, influencing the temperature-sensitive element of the thermostat in anticipation of the actual effect on the thermostat of the heat emitted from the heat exchange system. Such systems serve, with varying success, to overcome the "heat inertia" above described.

The present invention employs a vacuum tube circuit for amplifying relatively weak electrical signals, received from the control device, into strength sufficient to effect the desired control of the operating means. For anticipating the desired control, means, under the influence of the control of the operating means, are affected in such a way as to, in turn, affect the character of the output of the vacuum tube amplifying circuit.

It is therefore an object of the invention to provide an electrical amplifying control system for controlling operating means and for anticipating the control of the operating means by additional means directly affecting the output characteristics of the amplifying system.

In my presently co-pending applications, Serial Nos. 192,189 and 192,190, each entitled "Temperature control system" and filed on February 23, 1938, I have set forth and claimed a system of temperature control embodying an electrical network of the nature of a Wheatstone bridge as the temperature-sensitive control element, the "signal current" from the network feeding into the grid circuit of a sensitive amplifier circuit utilizing one or more vacuum tubes, the entire control system being energized by alternating current. The plate circuit output of the amplifier may thus be established by the voltage of the "signal circuit," as determined by the temperature condition of an appropriate element of said Wheatstone bridge organization. The plate circuit output is arranged to actuate a suitable electric relay or the like for directly controlling the generation or supply of heat medium to the heat exchange system.

In connection with the disclosure of the above identified co-pending applications, it is an object of the present invention to provide a system for controlling a heat exchange system, in which control system a primary temperature-sensitive thermostat is arranged to supply voltage of relatively small value and pre-determined phase to a vacuum tube relay, the said control system further embodying means within the vacuum tube relay circuit for "anticipating" a temperature change at the thermostat, and thus suitably actuating the heating prior to actual temperature change of the thermostat.

It is a further object of this invention to provide a vacuum tube relay circuit, adaptable for use with a thermostat feeding electrical current of variant voltage and phase—said voltage and phase being determined by the temperature of the thermostat—into the grid circuit of said vacuum tube relay circuit with means independent of said thermostat for affecting the plate current output of said vacuum tube circuit, said plate current output exercising control over the operation of the heat exchange system.

A feature of this invention resides in the incorporation, in a vacuum tube relay circuit of which the plate circuit output directly controls the heat exchange system, of a variant resistance element for controlling the value of the plate circuit output, the resistance of such element being under the direct control of electrical heating means which are energized or de-energized simultaneously with the operation of the heat exchange system.

A feature of certain embodiments of the invention resides in the placing of the above stated variant resistance element in a Wheatstone bridge circuit for providing adjustable regulation of the value of the plate circuit output.

The present invention incorporates, in the amplifier circuit of these and other types of temperature control systems, an electrical heating element arranged in heat-exchange relationship to a resistor of the vacuum tube circuit, such resistor being of the type in which a substantial alteration of its electrical resistance characteristic occurs upon the increase or decrease of its temperature. By suitable arrangement of the heating coil, it may be employed to raise the temperature of the resistor, for example, when the amplifier circuit has actuated the relay to provide for the generation of heat. The effect of the altered resistance on the amplifier circuit may be calculated to alter the plate current output sufficiently to cause a shutting off of the heating system while the voltage of the signal current from the bridge network remains substantially unchanged, thereby "anticipating" the change in voltage of the signal current which, as set forth in my stated co-pending applications, must inevitably follow the change in temperature of the bridge network. By suitable regulation, a definite change in signal current phase or voltage may be required to supplement the effect of the altered resistance before change in operating status of the heat generating or supply means may be effected.

It is thus a feature of the present invention that means are provided to anticipate the temperature change of the primary control element of the control system, without the incorporation of supplemental means at such primary control element, and thus without additional wiring or other electrical connection at the primary control element.

Other features and advantages will hereinafter appear.

In the accompanying drawings:

Fig. 1 is a schematic diagram of a portion of a conventional heating system, controlled by means embodying the present invention;

Fig. 2 is a representation of an electrical control circuit having incorporated therein the subject matter of the present invention; and Figs. 3, 4, 5 and 6, are representations of the electrical circuits of other control systems embodying my invention.

In a typical heating system, illustrated in part in Fig. 1, a steam boiler 1 is provided with an automatic fuel burner 2, generating steam for circulation through main 3 and branch pipe 3a to heat exchange unit of "radiator" 4, the condensation therefrom entering a return main 5 by way of the return branch 5a. The radiator is illustrated as serving a room 6, such room representing any enclosure of which it is desired to maintain the temperature at a predetermined point. To maintain such temperature, the thermostat, i. e., the primary sensitive control device A is placed in suitable relationship to the radiator 4, in accordance with familiar principles, and is connected by suitable wiring 7 to a secondary control organization B. As later described, the secondary control B incorporates vacuum tube amplifier means and suitable electrical relays for controlling an electrical circuit 8 which serves the fuel burner 2.

Referring to Fig. 2, D represents an alternating current power line, such as the conventional 110 volt 60 cycle service. The power line supplies the temperature control circuit, including the control B and the thermostat A, the latter being preferably an electrical network of the nature of a Wheatstone bridge, as disclosed in my aforesaid co-pending application Serial No. 192,190, filed February 23, 1938, and entitled "Temperature control system." As is more fully set forth in said application Serial No. 192,190, the control organization B does not have separate rectifier means, and thus the amplifier circuit of control organization B operates only during one-half of the alternating current cycle. Desirably, the thermostat A is electrically isolated from the power source D, as by an isolating transformer 11. Such transformer may be of the step-down type, so that the wiring between the secondary of the transformer and thermostat A, and between A and B, may come within a low voltage wiring classification.

As is set forth in detail in the aforementioned application Serial No. 192,190, a signal current of variant voltage and phase condition is initiated in the thermostat A by the relationship of the temperature of certain of the electrical resistance elements embodied in the thermostat to the "set" or control point temperature at which the enclosure 6 is to be maintained. The temperature of such thermostat elements, as is well understood, is directly influenced by the heating effect of the radiator 4 during periods of operation of the heating system and by natural cooling during periods of quiescence of the heating system. The signal current thus initiated in the thermostat A passes through suitable leads 7 to the secondary control organization B, which embodies an amplifier including vacuum tubes 21, 22, arranged in accordance with the principles set forth in said application Serial No. 192,190.

Referring to Fig. 2, the leads 23, 23 connect the power source D to a voltage divider designated by its points of connection 59, 60. The vacuum tube filaments 21a, 22a of tubes 21, 22 are supplied from said voltage divider, as is the screen grid 25 of tube 21. The coils 40 of a primary relay of which 43 represents the armature are energized by the output of vacuum tube 22, and, as shown, are connected into the plate circuit 32 of such tube. On a predetermined value of the output of tube 22, the coils 40 may be insufficiently energized to hold the armature 43 away from the relay contact 44, and as the armature 43 makes contact with 44, an electrical circuit is closed, said circuit energizing the coils of a heavy duty relay 55, which relay directly operates the automatic fuel burner 2. As appears from Fig. 2, an electrical heating coil 54 is placed in the electrical circuit of relay 55, and such heating coil is energized simultaneously with the closing of the circuit of contact 44.

It is important that the primary relay be snap-acting; that it be definitely on or off. At any certain high current value of the plate circuit 32 the armature 43 must snap away from the contact 44, and at a certain low current value it must snap into contact with 44. A suitable condenser 45 is employed with the primary relay to prevent an electrical kick-back through the grid 26 of vacuum tube 21 from causing a chattering of the armature 43. 27 is a high-value resistor which it has been found desirable to employ as a shunt across the leads 7, and a condenser 12 or equivalent device may be employed to bring the signal current in leads 7 exactly into phase with the voltage across the voltage divider 59—60. A condenser 42 is connected in shunt across the coil 40 so as to by-pass the high frequency currents and also so as to stop the armature 43 from following the pulsating direct current in the plate circuit of tube 22, such pulsating current being due to the use of alternating current.

In the embodiment of Fig. 2, the relay 55 includes the armature 57 operating between electrical contact points 56, 58, leads from the armature and the contact comprising a conventional three wire control circuit 8 for the fuel burner 2. For purpose of illustration, it is assumed that with the relay 55 energized, the closing of the circuit through armature 57 and contact 58 initiates the operation of the burner 2, and thus starts heat flow.

Desirably included in the circuit of voltage divider 59, 60, there is an electrical resistance element 50 of material having a "positive" temperature-resistance coefficient; that is, the electrical resistance of the element increases as its temperature increases. The coil 54 is arranged in suitable heat exchange relationship to the element 50, care being taken to eliminate capacity and inductive relationship of the two elements 54, 50.

When the thermostat A is calling for heat, that is, when the voltage and phase value of its signal circuit is in such suitable relationship to the power input of the control B that the power output through plate circuit 32 is insufficient to maintain the armature 43 and contact 44 in open circuit status, the armature 57 closes contact with 58, and heat is flowing to the heating system. The heating coil 54 is simultaneously energized and because of the relationship of coil 54 to resistance element 50, the temperature of the resistor 50 is increased, and its electrical resistance is increased.

As stated, resistor 50 is in the circuit of the voltage divider 59, 60, and is preferably disposed between the connection 59 and the filament 21a of tube 21. The effect of an altered resistance of 50, therefore, is to add to or subtract from the voltage impressed upon grid 26 of tube 21, this voltage being the voltage of the signal circuit arising in the thermostat A. An increase in the resistance of 50 causes the grid 26 to take a more negative bias, and, during the one-half cycle on which the tubes are working, this more negative bias causes less current to flow through resistor 31 to plate 28 of tube 21.

With less current flowing through 31, the voltage drop between grid 30, through 31 to point of connection 60 becomes less, and grid 30 becomes more positive. As grid 30 becomes more positive, more current flows through the plate circuit 32 of tube 22, and upon its attainment of a predetermined value, such plate current becomes sufficient to energize coils 40 of the primary relay and pull the armature 43 away from its contact 44. The circuit serving the relay 55 is thus opened, and the armature 57 of such relay drops away from the contact 58 and makes contact with 56, acting to halt the operation of the fuel burner 2, and simultaneously de-energize the heating coil 54.

As the temperature of resistor 50 must, therefore, drop, its lessened resistance causes the grid 26 to become more positive; increased current flows through 31. Grid 30 becomes more negative, and at a predetermined condition of the negative bias of grid 30, the value of current flowing through plate circuit 32 and thus through coils 40 becomes insufficient to maintain the armature 43 in open circuit status, and the armature, therefore, drops into contact with 44 and the heating cycle is repeated.

It will be obvious that the foregoing operation of the control organization B may take place while the value of the signal voltage from A to B remains constant; that is, the described operation may be solely the result of the effect on the circuit of the control organization B of the variant resistance of element 50, as determined by the heating effect of the heating coil 54. In other words, although the temperature of A may remain substantially constant—the temperature of A determining the character of the signal current—a change of temperature of A is "anticipated," that is, the normal operative effect of a change in temperature at A has been initiated before the temperature change has actually occurred.

It will be readily understood that with a suitable rearrangement of the contacts of the respective relays a "negative" temperature coefficient material may be employed for resistance element 50. It is not necessary to place the element 50 between the point of connection 59 and the filament 21a of tube 21; such resistance element may be interposed elsewhere along the voltage line 59, 60, as between the filament 21a and the screen grid connection 25 or between such screen grid connection and the filament 22a of vacuum tube 22. It is also practicable to locate the resistor 50 at some suitable point in the plate load 31.

In Figure 3, my invention is shown in its application to a second arrangement of vacuum tube amplifier-relay circuit, the circuit per se being of the type disclosed in the U. S. patent to Donle, Patent No. 2,189,461, granted Feb. 6, 1940, and entitled Electronic tube circuits. The amplifier-relay circuit B embodies a standard three-element tube 62, and an oscillating vacuum tube 63, the respective cathodes 62a, 63a of said tubes being served by a voltage divider designated by its points of connection 64, 65.

The thermostat A, which may be of the Wheatstone bridge type as aforesaid, and the voltage divider 64, 65 are fed from the same alternating current system, the thermostat A having an isolating transformer 11, and the connection of the amplifier system with the power service D being effected through leads 23, 23.

As is more fully set forth in the stated Donle patent, the oscillating tube 63 is arranged to go into or out of oscillation with a snap-action. The plate circuit of oscillating tube 63 feeds into the coils 40 of a relay, the relay having an armature 43 arranged to make contact respectively with contact 44a or 44, as the coils 40 are energized or de-energized by the said plate circuit. Leads from the armature 43 and the contacts 44, 44a form the three wire circuit 8.

Oscillating tube 63 has a feed-back arrangement 67; and its grid circuit embodies a suitable inductance 68 and a grid resistor and condenser, jointly designated 71. By reason of the electrical effect of the oscillating tube circuit as set forth in the stated Donle patent, said circuit incorporating the arrangement of the plate and the cathode connections of tube 62 across inductance 68 instead of a variable resistor or capacity, tube 63 goes in and out of oscillation with "snap action," resulting in the impression of either a high or a low plate current across the coils 40 of the relay.

When a change of voltage occurs on grid 66 of tube 62, such change resulting from a change in the voltage of the signal current, the relation of plate circuit resistance, or capacity, or both, changes between the plate 69 of tube 62 and the zone 70 of the voltage divider. The change in relationship throws tube 63 in or out of oscillation, increasing or decreasing to a marked extent and by a "snap action" the plate current through the coils 40, such plate current thereby operating, in one or the other direction, the armature 43.

As the tube circuit is fed from a source of unrectified alternating current, as aforesaid, the stated relationship will, therefore, only be effective during one-half of each alternating current cycle. Therefore, it is desirable to place a condenser 72 across the coils 40 to by-pass the high frequency currents and at the same time to stop armature 43 from following the pulsating direct current in the plate circuit of tube 63 due to the application of alternating current to the apparatus. A suitable condenser 76 is employed to prevent high frequency oscillations from going out of the signal circuit leads 7.

The condenser 76 may be located as shown or interposed directly between the grid 66 and the cathode 62a.

The present invention in one form constitutes interposing a positive temperature coefficient material 77 in the voltage divider circuit 64, 65, and placing in heat exchange relationship thereto a heating coil 78. As is set forth with respect to the description of Fig. 2, the temperature coefficient material 77 may be located in the zone 70 between the cathode 62a and inductance 68, or elsewhere in the circuit.

In the embodiment of Fig. 3, the feed-back arrangement 67 and inductance 68 are so related and adjusted that when heat is called for by the thermostat A, grid 66 is made to go more positive with respect to its cathode 62a. In this occurrence, oscillation stops and the current through the coils 40 increases to a higher value and draws in armature 43, making contact with 44a, and actuating the fuel burner 2 to generate heat. Simultaneously, additional current flows through the heating coil 78, and by reason of its heat exchange relationship with the resistor 77, it is warmed and, it preferably being positive temperature coefficient material, its resistance is increased.

Because 77 is a part of the voltage divider 64, 65, along which the tubes are disposed, an increase in the resistance of 77 will cause grid 66 to become more negative. The effect of the increased negative bias of grid 66 is to cause oscillation to start and a sharp drop in the plate current emanating from tube 63 to the coils 40 of the relay. The armature 43 thereof will drop against the lower contact 44 causing the fuel burner to cease operation. As the current through heating coil 78 is simultaneously lessened, the resistor 77 will cool, and its change of resistance will cause the grid 66 to begin to go more positive with respect to its cathode 62a and actuate the remainder of the amplifier unit to call for heat again.

A suitable condenser 75, may be used to by-pass high frequency currents around the heating coil 78.

Referring now to Fig. 4, the thermostat A, which may be of the Wheatstone bridge type aforesaid, and which may be served from an alternating current source D through the agency of an isolating transformer 11, is arranged to feed its signal circuit along the leads 7 to the amplifier and relay organization B. In the present instance, the amplifier organization B embodies a vacuum tube 80 of the type known in the art as a "trigger" tube, or generally by its trade name "Thyratron." The secondary control organization B is served from the power source D, as through the leads 23, 23. The cathode 84 of tube 80 is suitably connected to a voltage divider, designated by its points of connection 82, 83, and such cathode is arranged to be heated by means not shown, but well known to the art.

Voltage divider 82, 83 comprises a resistor 91, desirably of positive temperature coefficient resistance material and a fixed resistor 92. As indicated, the grid 85 of tube 80 is served directly by one of the leads 7 from thermostat A; the plate circuit 86 of the tube 80 serves the coils 88 of a suitable relay, and has in series in such circuit an electrical heating coil 90 placed in suitable heat exchange relationship to the resistor 91. The circuit through coils 88 is completed, as shown, by an electrical connection at 83.

A suitable condenser 87 is shunted across the coils 88 to prevent the armature 89 of the relay from following the pulsating direct current in the plate circuit of tube 80.

As is well known, an operating characteristic of "Thyratron" tubes resides in the fact that when alternating current is applied to the tube, and the bias on the grid is varied, as, for example to reduce the value of a negative grid bias to a certain point, the plate current of the "Thyratron" tube jumps suddenly to a maximum value, i. e. is "snap-acting." As the negative grid bias is increased or changed to make it more negative, a point of operation is reached at which the plate current falls suddenly to zero. "Thyratron" tubes of this type afford ample power output to operate a heavy duty relay, and thus, the relay represented by the coils 88 and the armature 89 may directly operate a motor or equivalent in the fuel burner 2. A secondary relay, such as is shown in Fig. 2, is thus not required.

In the instance shown the three-wire circuit 8 is so arranged that when coils 88 are energized sufficiently to draw in the armature, and thus make contact with the upper contact shown, the fuel burner 2 is actuated to provide the generation of heat.

Assuming that the thermostat A of the control system A, B, is at its critical operating point, i. e., its set temperature, a change in the temperature of A sets up a signal voltage in the leads 7 suitable to move the potential of grid 85 with respect to cathode 84 in a positive direction, thus reducing the negative bias of the grid. At a certain value of such negative bias, the current flowing from point 83 through coil 88 and resistance coil 90 will jump to a maximum value, i. e., a value sufficient to energize the coils 88 to a degree at which the armature 89 will be moved upwardly to make contact with the upper contact of the fuel-burner control circuit 8. Simultaneously, the electrical resistance coil 90 will commence to emit heat and, it being in thermal relation to resistance 91, the latter will warm. As 91 warms, it being a positive resistance material, its resistance increases. Grid 85, being connected to point 82 through the electrical network of the thermostat A will become more negative; as its negative bias increases, a point will be reached, without any further temperature change at the thermostat A, at which the plate current flowing through coil 88 will drop suddenly to its low value, releasing armature 89 to fall against the lower contact of the control circuit 8, in which position fuel burner 2 is halted in its operation. If the signal current from A remains unchanged, indicating no change of temperature at A, the heating coil 90, not being energized, will permit the resistor 91 to cool. The subsequent reduction of the resistance of 91 exerts an influence tending to make the grid 85 less negative, that is, more positive. By suitable arrangement of resistance values, the cooling of 91 may continue to a point where the grid bias of 85 again reaches the critical point at which the plate current through coils 88 jumps to the value necessary for pulling in the armature 89 against the upper contact, and thus operating the fuel burner.

In Fig. 5, the thermostat is indicated in its schematic wiring relationship to the amplifier circuit. The thermostat includes an element 93 of negative electric resistance material and a normally fixed but variable resistor 98, the latter being suitably mounted for convenience in adjustment of the temperature control point.

The control circuit of Fig. 5 is likewise fed from a source of alternating electrical current D, such current serving a voltage divider represented by its points of connection 106, 107.

Voltage divider 106, 107 comprises a fixed resistance 104, an element 103 of negative temperature resistance material, and preferably, but not essentially, a second fixed resistance 103a.

The thermostat may be considered as a second voltage divider, consisting of a relatively low fixed resistance 105, the resistance element 93, and the variable resistance 98. The grid 99 of "Thyratron" tube 94 is connected into the second voltage divider, preferably intermediate the resistors 93, 98 thereof. The plate circuit 100 of tube 94 includes, in series of electrical relationship, heating coil 102 disposed in heat exchange relationship to resistor 103, and the coils 96 of a heavy duty relay of which 97 is the armature. It will be understood that the heater 102 is preferably not in a capacity or inductive relationship to negative material 103.

When the coils 96 are sufficiently energized by the plate circuit 100 to draw in on the armature, thus making an electrical connection of the armature with the upper contact point of the electrical circuit 8, the fuel burner 2 is actuated to generate heat. In the circumstance that the electrical circuit A is actuating the fuel burner to provide heat, the plate circuit 100 is of such value that the heater 102 is giving off substantial heat. As 103 warms, being a negative resistance material, its resistance is lowered, and its lowered resistance decreases the voltage between 101 and 107. Since grid 99 is served by the voltage divided 93—98, the stated decrease of voltage causes the grid 99 to become more negative, eventually reaching the point at which the plate current drops to its lower value and permits the armature 97 to drop against the lower contact of circuit 8, shutting off the heat supply.

The grid 99 is given a voltage position with respect to cathode 101 which is only changed by a change of temperature at 93 or a change of temperature of the resistance element 103. Assuming a minimum current flow through 102, and further assuming that 103 has reached a constant low temperature, the thermostat element 93 will cool until its resistance has sufficiently increased to make the grid bias of 99 less negative with respect to 101. When the negative bias of 99 has reached a predetermined low point, the "Thyratron" tube 94 is actuated in its characteristic manner, i. e., the plate current is brought suddenly to its high value, turning on the burner 2. Coil 102, being in series in such plate circuit acts immediately to raise the temperature of 103 and thus reduce the resistance thereof. The grid bias of 99 thus becomes more negative in relation to 101, and when its negative bias reaches a definite point, the tube 94 acts to reduce the value of the plate circuit to a point where the relay 96, 97 is again actuated in a manner which shuts off the action of the fuel burner 2.

As above stated, the adjustable resistance 98 may be used to establish the control temperature of the thermostat A, i. e., the temperature at which the relay will respond. As will be obvious, 93 and 98 must have a substantial resistance value, to offset the effect of the heat capacity of its surroundings and the heating effect of current flow therethrough.

A condenser 95 is desirably shunted across the coils 96 of the relay for the purpose above set forth with respect to Fig. 4.

With reference to Fig. 6—the temperature responsive resistance element operative to "anticipate" the control of the heating system, or other operating means, by the thermostat, or other control devices, may be included in a Wheatstone bridge network to form one of the resistances thereof. An adjustable voltage divider for the network may be provided to afford manual variation of potential supplied by the network.

The circuit of Fig. 6 is largely similar to that of Fig. 3. The vacuum tube amplifier-relay circuit B embodies a standard triode tube 110 functioning as a control for the oscillating tube 111.

The thermostat A, which may be of the Wheatstone bridge type as previously described, is fed from the alternating current power line D— through isolating transformer 11, as is also the circuit B— through isolating transformer 112—, and the supplemental Wheatstone bridge network C— through isolating transformer 113.

Oscillating tube 111 has a feed-back arrangement 114 in the plate circuit, and a cooperating inductance coil 115 in the grid circuit. The cathode 110a and the plate 110b of control tube 110 are connected in circuit with inductance coil 115, being adapted to throw oscillating tube 111 into and out of oscillation with a snap-action when the grid 110c of the control tube is given a suitable bias by voltage supplied from thermostat A and bridge network C.

The relay 116 is connected into the plate circuit, functioning to actuate operating means, such as a heating system, when snap-action of oscillating tube 111, as aforedescribed, produces a sharp increase of plate current. Because there is no grid leak and condenser provided in the grid circuit 117 of oscillating tube 111, oscillation produces an increase of plate current, i. e. snap-action, to actuate relay 116. A condenser 118 may, if desired, be included in grid circuit 117.

An electric heating coil 119 is included in the plate circuit. When plate current flows through the plate circuit to actuate relay 116, the heating coil 119 heats up. A condenser 120 may be by-passed about relay 116 and heating coil 119 to provide a path for high frequency currents and to prevent chattering of the armature of the relay.

Included in one leg of the supplemental Wheatstone bridge network C, is a temperature responsive resistance element 121 disposed in thermal relationship with heating coil 119 and having a positive temperature coefficient. A fixed resistance 122 may be included in the same leg. A fixed resistance 123 provides another leg of the bridge, and a voltage divider 124 may make up the other two legs. A slider 125 is preferably adjustable along voltage divider 124 for varying the voltage output of the bridge. As aforestated, alternating current is supplied to the bridge network C from power lines D through the isolating transformer 113.

The Wheatstone bridge network C is connected into the circuit of grid 110c of control tube 110 from point 126 and is connected with the cathode 110a of the tube through slider 125.

The thermostat A is also connected into the circuit of grid 110c for supplying voltage of variant value thereto, the value of the voltage depending upon the temperature surrounding the thermostat. Condensers 127 and 128 may be provided for by-passing high frequency currents.

Voltage supplied from bridge network C combines with voltage supplied from thermostat A, or other source of control voltage, to provide the net voltage on grid 110c of control tube 110. Such net voltage on grid 110c may be varied at will by adjusting slider 125 along voltage divider 124.

The alternating current supplied to the thermostat A, the amplifier-relay circuit B, and the supplemental Wheatstone bridge network C is in phase at all the stated points of supply, the wiring of transformers 112 and 113 being such that during the half cycle when polarities are as indicated at 112 the polarities at 113 will be as indicated. A condenser 129 may be inserted between the lead wires 130 and 131 which supply current to transformer 112, for by-passing high frequency oscillations which might otherwise be transmitted as radio interference out along the power wires.

Variation of apparent resistance or apparent capacity or both between cathode 110a and plate 110b of control tube 110, as produced by variation in the net voltage supplied to grid 110c from thermostat A and the bridge network C, throws the circuit of tube 111 into and out of oscillation.

Similar to the functional characteristics of the circuit of Fig. 3, at a given voltage on grid 110c, the apparent resistance, capacity, or both between cathode 110a and plate 110b is sufficiently low to take current from inductance coil 115 and thus prevent oscillation in the circuit of tube 111. Accordingly, the flow of plate current through relay 116 and electrical heating coil 119 is at a minimum. When the value of the voltage applied to grid 110c is such that the said grid becomes more negative during the half cycle when the polarities at 112 and 113 are as indicated, the apparent resistance, capacity or both between cathode 110a and plate 110b increases, preventing current loss from inductance coil 115 and throwing the circuit of tube 111 into oscillation. Such oscillation jumps the plate current output of tube 111 to a maximum value in a so-called "snap-action" and thus actuates relay 116 to pull in its armature and turn the heating system on, assuming the operating means controlled is a heating system. The flow of plate current will also heat coil 119, thus changing the resistance of temperature responsive resistance element 121 of the bridge network C, and thereby altering the net voltage supplied from said network C to grid 110c of control tube 110 for "anticipating" normal control from thermostat A, as described in detail hereinbefore.

In all the aforedescribed embodiments of the invention the combination of electric heating coil and temperature responsive resistance element may be considered to be a "timer." A voltage-time curve drawn for any timer would curve gradually upwardly to a maximum whereupon it would flatten out, the exact nature of the curve being determined by the particular timer.

The maximum value of the change of voltage applied by any timer, as a grid bias, is desirably more than the differential voltage necessary to actuate the relay—this for insuring positive relay actuation. The time interval necessary for the timer to produce maximum voltage will depend upon the characteristics of the timer selected for the particular use. This time interval, following, as it does, actuation of the relay in response to the thermostat, separates the thermostatic-actuation of the relay from the reverse time-actuation of the relay.

For a given installation of control system pursuant to the invention and in connection with a heating system, assume ½° differential actuates the relay—speaking now of voltage in terms of temperature. The timer might then advantageously be such as to provide a maximum change of 1°. The control system might advantageously be such that, with the timer unheated, 70° at the thermostat actuates the relay in reverse to turn the heating system off. Now, considering the timer heated over a time period sufficient to develop maximum voltage, or 1° in reverse to the thermostat, then the thermostat becomes operative at 69° to turn the heating system on, and at 69½° to turn the heating system off. Between 69½° and 70° room temperature, as effective on the thermostat, less than maximum voltage from the timer combines with voltage from the thermostat to actuate the relay and the heating system on and off. The action is proportional, that is, as the room temperature rises to 70° the on periods will be of shorter duration, and as the room temperature falls to 69½° the control system will continuously call for heat from the heating system since the timer can add the equivalent of only 1° and therefore cannot produce the effective temperature of 70½° required to cause shutting off of the heat. Above 70°, the control system will continuously call for no heat from the heating system since the timer will be cool and the room must fall to 70° to start a new heating cycle.

From the foregoing description, it is seen that my invention contemplates electrical means for operating a heat exchange organization, the electrical means constituting an electrical switch operated from the output of an electrical circuit embodying vacuum tubes, the vacuum tube output being determined by the bias of a grid of the vacuum tube circuit. For establishing the grid bias, I employ, jointly, a temperature-sensitive thermostat organization of a type which will alter the grid-circuit bias upon the deviation of the thermostat from a predetermined control temperature, and a second means, independent of the thermostat and arranged to "anticipate" changes of temperature at the thermostat. The secondary means includes an element of resistance material incorporated in said electrical circuit, which element has the property of variation of resistance with variation of temperature, and an electrically energized heating element for effecting temperature change of the resistance material, the heating element being controlled by the operation of the electric switch.

For any condition of operation of the heat exchange system, therefore, the secondary grid-bias means may operate prior to that change in temperature of the thermostat which is necessary to alter the grid bias of the vacuum tube circuit sufficiently to cause a change in the status of operation of the heat exchange system; the change in grid bias, effected by the secondary means, may per se cause an operation of the electric switch, or may cause sufficient change in the grid bias to require a slight supplemental action of the thermostat to complete the necessary grid bias change.

While the temperature-sensitive thermostat has been described as operating from a common alternating current power source, it will be obvious that such thermostat may be operated by direct current means. It will also be understood that the illustrated transformer 11 may be installed to electrically isolate the thermostat or the vacuum tube relay organization from the common alternating power source.

Whereas I have described my invention by reference to specific forms thereof, it will be understood that many changes and modifications may be made without departing from the spirit of the invention.

I claim:

1. In a temperature control system having an electrical circuit embodying vacuum tube means, a thermostat arranged to control the plate-circuit output of said vacuum tube system upon a change in temperature at said thermostat, a primary relay in the plate circuit of said vacuum tube means, a secondary relay operated from said primary relay, a temperature-sensitive resistance means arranged in said vacuum tube circuit to effect a change in the grid circuit thereof upon a change in the temperature of said temperature-sensitive resistance means, and an electrical heating coil arranged in heat-exchange relationship to said resistance means and arranged to be energized simultaneously with the operation of said secondary relay.

2. A temperature control system comprising a thermostat, an electrical circuit embodying vacuum tubes electrically connected to said thermostat, said thermostat and said vacuum tube circuit deriving power from a common source of alternating current, said thermostat being electrically isolated from said common source by transformer means, said vacuum tube organization including an oscillating tube arranged to go in and out of oscillation with immediate maximum effect upon a predetermined change in the grid bias of said tube, the plate circuit of said oscillating tube energizing an electric relay arranged to effect heat flow in a heat exchange system upon condition of maximum oscillation of said tube, said condition of oscillation being controlled jointly by said thermostt and by temperature-sensitive resistance means disposed in said vacuum tube circuit, said resistance means having an electrically energized heating element disposed in heat exchange relationship therewith; said heating element deriving electrical power upon the operation of said relay in a manner effecting heat flow.

3. In a temperature control system for use with heat exchange apparatus of a type adapted to effect temperature changes in a given space, vacuum tube relay means connected to a source of electric power and including plate and grid circuits, means operable upon the attainment of a predetermined value in plate current to effect operation of said apparatus, and operable upon a deviation in plate current in one direction from said predetermined value to stop operation of said apparatus, thermostatic means operable upon a change in space temperature in one direction from a preselected point to change the potential on the tube grid to such a degree as to cause the attainment of said predetermined value in plate current, and electrical means operable simultaneously with the attainment of said predetermined value in plate current to change such value after a period of time in the direction to stop the operation of said apparatus, and said electrical means being operable upon the lapse of a period of time after stopping of operation of the apparatus to restore the plate current to said predetermined value.

4. In a temperature control system for use with heat exchange apparatus of a type adapted to effect temperature changes in a given space, vacuum tube relay means connected to a source of electric power and including plate and grid circuits, means operable upon the attainment of a predetermined value in plate current to effect operation of said apparatus, and operable upon a deviation in plate current in one direction from said predetermined value to stop operation of said apparatus, thermostatic means operable upon a change in space temperature in one direction from a preselected point to change the potential on the tube grid to such a degree as to cause the attainment of said predetermined value in plate current, and means operable upon the lapse of a period of time after the beginning of operation of said apparatus for changing the potential on the tube grid and thereby varying the plate current from its predetermined value and stopping said apparatus, and operable upon the lapse of a period of time after such stoppage to change again the grid potential to such a value as to restore the plate current to said predetermined value.

5. In a system for controlling the operation of temperature changing apparatus in accordance with variations in temperature in a space served by said apparatus, vacuum tube relay means connected to a source of electric power and including plate and grid circuits, switching means operated by said plate circuit and operable upon the attainment of a predetermined value in plate current to effect operation of said apparatus and operable upon a deviation in one direction of the plate current from said predetermined value to stop operation of said apparatus, thermostatic means operable upon a change in space temperature in one direction from a preselected point to vary the potential on the tube grid to a degree sufficient to effect the attainment of said predetermined value in plate current, a resistance element connected in one of said circuits and operable when heated to change its resistance characteristics to such a degree as to cause a change in plate current of sufficient magnitude to effect the stopping of operation of said apparatus, and means operable simultaneously with the operation of said switching means for heating said resistance element.

6. In a system for controlling the operation of temperature changing apparatus in accordance with variations in temperature in a space served by said apparatus, vacuum tube relay means connected to a source of electric power and including plate and grid circuits, switching means operated by said plate circuit and movable to closed position upon the attainment of a predetermined value in plate current to effect operation of said apparatus and movable to open position upon a deviation in one direction of the plate current from said predetermined value to stop operation of said apparatus, thermostatic means operable upon a change in space temperature in one direction from a preselected point to vary the potential on the tube grid to a degree sufficient to effect the attainment of said predetermined value in plate current, a resistance element connected in one of said circuits and operable when heated to change its resistance characteristics to such a degree as to cause a change in plate current of sufficient magnitude to effect the stopping of operation of said apparatus, an electrically energized heating coil in heat exchange relationship with said resistance and arranged in an electrical circuit, and means for opening and closing the last-mentioned circuit simultaneously with the movement of said switching means to open and closed positions.

7. In a system for controlling the operation of temperature changing apparatus in accordance with variations in temperature in a space served by said apparatus, vacuum tube relay means connected to a source of electric power and including plate and grid circuits, switching means operated by said plate circuit and movable to closed position upon the attainment of a predetermined value in plate current to effect operation of said apparatus and movable to open position upon a deviation in one direction of the plate current from said predetermined value to stop operation of said apparatus, thermostatic means operable upon a change in space temperature in one direction from a preselected point to vary the potential on the tube grid to a degree sufficient to effect the attainment of said predetermined value in plate current, a resistance element connected in said grid circuit and operable when heated to change its resistance characteristics and the potential on the tube grid to such a degree as to cause a deviation in plate current value of sufficient magnitude to move said switching means to open position, and electrically energized heating means arranged in heat exchange relation with said resistance element and connected in a circuit opened and closed by said switching means.

WILLIAM K. WALKER.